United States Patent Office 3,754,073
Patented Aug. 21, 1973

3,754,073
PROCESS FOR MANUFACTURE OF ZIRCONIUM TETRACHLORIDE IN REACTOR OF SPECIFIC LINING
Ferdinand Langenhoff, Mondorfer-Str. 9, 5211 Ranzel-Deutz, Erich Termin, Kraftwerkeg 4, 7887 Laufenburg, Arnold Lenz, Gerstenkamp 7, 5 Cologne-Stammheim, and Georg Schinke, Feldmuhlestr. 2, 5211 Ranzel, Germany
No Drawing. Filed Oct. 1, 1970, Ser. No. 77,333
Claims priority, application Germany, Oct. 2, 1969,
P 19 49 758.6
Int. Cl. C01g 25/02, 25/04
U.S. Cl. 423—79
4 Claims

ABSTRACT OF THE DISCLOSURE

Use of a novel lining material, which is a shakable or tampable mixture of fine-grained corundum and as binder, the partial water hydrolysis product of silicon and aluminum alcoholates diluted with a suitable solvent.

This invention relates to the production of zirconium tetrachloride with or without by-product silicon tetrachloride. It more particularly refers to a novel reactor lining material for such production.

The manufacture of zirconium tetrachloride, with or without co-produced additional silicon tetrachloride, can be performed in a per se known manner through the reductive chlorination of zirconium oxide or zirconium sand in the presence of carbon. The working temperatures in this process can reach up to 1300° C. Under these reaction conditions and in the presence of carbon, carbon monoxide, carbon dioxide, phosgene, chlorine, hydrogen chloride and zirconium tetrachloride, very severe demands are made on the reactor lining material. It has been found that even quartz fails to meet these requirements since the quartz recrystallizes, resulting in cracks caused by brittleness. Moreover, silicon dioxide will also be seriously affected by the condition of this reaction.

It is therefore an object of this invention to provide a novel apparatus in which zirconium oxide is reductively chlorinated to zirconium tetrachloride.

It is another object of this invention to provide a novel reactor lining.

Other and additional objects of this invention will become apparent from a consideration of this entire specification.

According to this invention, the process of producing zirconium chloride from zirconium oxide is significantly improved by using as the reaction zone a pipe reactor lined with the hardened product of α-corundum admixed with the water partial hydrolysis product of silicon and aluminum alcoholates, which hardened product has an $SiO_2$ content of less than about 2 weight percent, preferably less than about 1 weight percent. The hardening of the reactor lining material is accomplished by heating such in the mold shape desired to about 1100° C. to 1300° C.

The α-corundum is fine-grained, having a particle size distribution between about 1 and 100 microns, preferably between 1 and 20 microns. The silicon and aluminum alcoholates can be derived from aliphatic, arylaliphatic, cycloaliphatic or aromatic alcohols. It is preferred to use $C_2$ to $C_4$ alkyl alcohols. In the event that the hydrolyzing speeds vary too much with the utilized aluminum and silicon alcoholates, a small amount of a titanium alcoholate can be employed; see German published patent specification 1,286,038. $C_1$ to $C_4$ alkyl alcohols, acetone or methylethyl ketone, for example, are suitable solvents. The proportions of constituents preferred are: α-corundum 85 to 96%; hydrolyzed silicon and aluminum alcoholates 1.35 to 5%; and solvent 2.65 to 10%.

Water can be added to the mixture in an amount of up to 12 percent by weight, based upon the solvent-free binding agent weight.

The reactor lining of this invention can be manufactured by means of an inner mold placed at the desired distance spaced from the inside or a pipe wall and the space therebetween filled with molding material. The molding material is then heat-hardened and the inner mold removed. Alternatively, suitable pipes or other shapes can be separately made and then assembled into a reactor.

The following examples are illustrative of this invention without being limiting thereon.

EXAMPLE 1

After placing a smooth inner mold in a nickel pipe (diameter 400 mm., height 1,000 mm.), a mixture of α-corundum with a grain size of up to 30 microns and 8 percent by weight of a 33 percent by weight isopropyl alcohol solution of a mixture condensed with 1 mol of water from 0.5 mol of silicon ethyl alcoholate and 1.5 mol of aluminum sec. butyl alcoholate, is introduced along with tamping or shaking. The inner part of the mold, as is also customary in concrete pipe manufacturing, is removed after the molding operation. The hardening substance is then baked at about 1100 to 1300° C.

In the reactor equipped with this lining, zirconium tetrachloride was manufactured at 1000° C. according to the equation: $ZrO_2 + 2C + 2Cl_2 = ZrCl_4 + 2CO$. After an onstream period of several weeks, there could not be noted any wear or tear of the lining material.

EXAMPLE 2

The same lining as in Example 1 was manufactured, only in this case 10 percent water by weight in relation to the solvent-free binding agent was added to the raw material.

EXAMPLE 3

A reactor according to Example 1 was utilized over a period of several weeks for the chlorination of zirconium sand at 1100 to 1200° C., without any noticeable wear and tear on the lining material.

The reaction proceeded according to the equation:

$$ZrSiO_4 + 4C + 4Cl_2 = ZrCl_4 + SiCl_4 + 4CO$$

What is claimed is:
1. In the process of producing zirconium tetrachloride from zirconium oxide by reductive chlorination with chlorine in the presence of carbon in a tube reactor at elevated temperatures; the improvement which comprises using as said tube reactor having a lining on the inside thereof which is the heat-hardened product of a shakeable mixture of (a) solvent selected from the group consisting of $C_1$-$C_4$ alkyl alcohol, acetone and methylethyl ketone, (b) α-corundum and (c) a binder which is the partial water hydrolysis product of silicon and aluminum alcoholates, said alcoholates being derived from aliphatic, arylaliphatic, cycloaliphatic or an aromatic alcohol, which heat-hardening has been accomplished at about 1100 to 1300° C., and which mixture has an $SiO_2$ content of less than about 2 wt. percent, the amount of α-corundum being between 85 and 96%, the amount of hydrolyzed silicon and aluminum alcoholates being between 1.35 and 5% and the amount of solvent being between 2.65 and 10% by weight.
2. The improved process claimed in claim 1, wherein the lining has an $SiO_2$ content of less than about 1 weight percent.
3. The improved process claimed in claim 1, wherein the mixture additionally contains up to about 12 weight percent water.

4. The improved process claimed in claim 1, wherein said α-corundum is fine-grained and has a particle size distribution between about 1 and 100 microns.

References Cited
UNITED STATES PATENTS

| | | | |
|---|---|---|---|
| 3,101,249 | 8/1963 | Priscu | 23—87 R |
| 2,946,654 | 7/1960 | Hnilicka, Jr. | 23—87 R |
| 3,488,143 | 1/1970 | Wendell et al. | 23—87 R |
| 2,214,612 | 9/1940 | Greenberg | 23—87 R X |
| 2,946,668 | 7/1960 | Richelsen | 23—87 R X |
| 2,849,293 | 8/1958 | Wendell, Jr., et al. | 23—281 |
| 3,058,817 | 10/1962 | Irani | 23—284 |
| 3,547,832 | 12/1970 | Haas et al. | 106—65 |

EDWARD STERN, Primary Examiner

U.S. Cl. X.R.

423—76, 492